United States Patent

[11] 3,549,864

[72] Inventor Alan John Borer
 Crowborough, Sussex, England
[21] Appl. No. 747,982
[22] Filed July 26, 1968
[45] Patented Dec. 22, 1970
[73] Assignee Servomex Controls Limited
 Crowborough, England
 a British Company
[32] Priority Aug. 2, 1967
[33] Great Britain
[31] No. 35428/67

[54] METHODS OF AN APPARATUS FOR TEMPERATURE CONTROL
 11 Claims, 1 Drawing Fig.
[52] U.S. Cl. .................................................. 219/497
[51] Int. Cl. .................................................. H05b 1/02
[50] Field of Search ........................................ 219/399,
 430, 497, 499, 510, 494

[56] References Cited
UNITED STATES PATENTS
2,422,734  6/1947  Jung ........................... 219/497
2,843,714  7/1958  Stanton ....................... 219/494

Primary Examiner—Bernard A. Gilheany
Assistant Examiner—F. E. Bell
Attorney—Holcombe, Wetherill & Brisebois ABSTRACT: A temperature control primarily for an air circulatory oven in which a thermally insulated mass situated in the oven has its temperature controlled in a desired manner and the measured temperature difference between the mass and the oven is employed to control supply of heat to the oven so as to reduce the temperature difference towards zero.

PATENTED DEC 22 1970 3,549,864
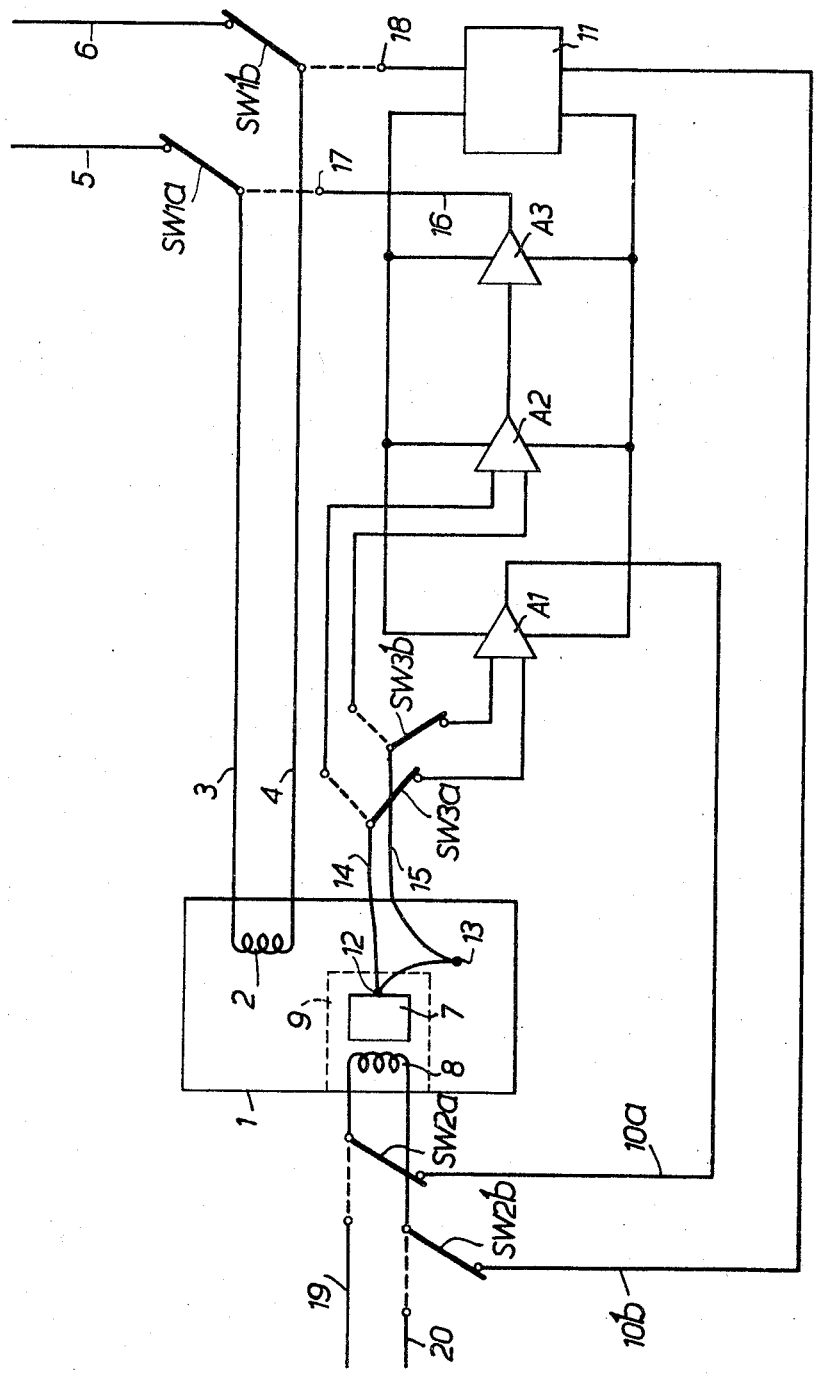
INVENTOR
A. J. BORER
BY
Holcombe, Wasserull & Brisebois
ATTORNEYS

METHODS OF AN APPARATUS FOR TEMPERATURE CONTROL

This invention relates to methods of an apparatus for temperature control and has particular, although not exclusive reference to such control in circulatory air ovens.

According to the present invention a method of controlling the temperature in a given region includes the steps of controllably heating or cooling a mass of known thermal properties, continuously determining the difference in temperature between the mass and the given region, and heating of cooling the given region in dependence upon the said temperature difference to reduce it towards zero.

The method may also include the initial steps of heating or cooling the given region until it reaches a predetermined temperature, simultaneously and continuously determining the difference in temperature between the given region and the mass, and heating or cooling the mass in dependence upon the said temperature difference until the mass also reaches the predetermined temperature.

Further according to the invention apparatus for carrying out the above method includes a heater and/or cooler located in heat transferring relationship with the given region, a mass of material, a heat transfer arrangement for heating and/or cooling the mass and for connection to a temperature controller whereby the mass may be controllably heated or cooled, temperature measuring means for measuring the difference in temperature between the mass and the given region, and a controlled power supply connected to the said heater and/or cooler and controlled by the temperature measuring means to reduce the said temperature difference towards zero.

In particular the given region may be located within a fluid circulatory system such as a circulatory air oven.

As will be seen from the following description, the temperature of a circulatory fluid can be controlled to rise at a constant rate if the mass of material, its specific heat and the power applied to the heating or cooling means for the block also remains constant, assuming no loss or gain of heat to the surroundings.

Consider a 1-inch cube of mass M and specific heat S, M and S being constant, to which power p is supplied for an incremental period t. If the power is supplied for a time t to raise the temperature of the mass for To to T, then:

$$T = T_o + \int_{t=0}^{t=\frac{t_1}{MS}} p\, dt$$

If p is constant and equals P, then:

$$T = T_o + \frac{P}{MS} t$$

, whereby the temperature of the mass rises at a constant rate. It will also be seen that it will rise at a constant rate whenever $\frac{P}{MS}$ is constant.

The basic concept of the present invention is that a mass of material has its temperature positively controlled to be at the desired temperature of the fluid in the system and that the temperature difference between the mass and the fluid is employed to determine the amount of heat required to reduce the difference to zero. For the most efficient working of the invention it should be ensured that the mass should neither gain nor lose heat from its surrounding medium so that it is in a state of thermal equilibrium. This is most conveniently carried out by placing the mass within the system in the region the temperature of which is being controlled. The mass will, of course be suitably lagged.

A further modification can be considered when the invention is applied to a circulatory air oven, the mass being lagged and positioned within the oven. Supposing both the oven and the mass are both initially at 0° C. and the temperature control cycle does not commence until the oven is at 200° C. The air heater will heat the air in the oven to this temperature in a few seconds but the mass will only be heated through its lagging. For a 0.1° C. differential between the air and the mass, the temperature of the mass will increase at a rate of, say, 0.01° C. per minute and it can be shown in such circumstances that at any moment after the initial heating of the air and during such an isothermal period, $T_m = 200(1-e^{-t}/10)°C.$ where $T_m$ is the temperature of the mass and t is the time measured from energization of the heater. This equation shows that the mass takes one hour before reaching 199.8° C. However, it may not be wished to wait for such a long isothermal period and in one embodiment of the invention the heater for the mass is energized during an initial period so as to bring the mass up to the required temperature in a very few moments.

It will be clear that when the mass is provided with a normal electric heater it will only be possible to carry out the invention for a positive temperature ramp. However, if the mass were to be placed on a cooling device, a Peltier block for example, it would be possible to carry out the invention whereby a negative temperature ramp is also provided. With suitable electronic programming of the mass heater and/or cooler, the invention may be carried out to provide any required function of temperature with time.

The invention will now be described in greater detail, by way of example, with reference to the accompanying drawing which is a diagrammatic representation of a circulatory air oven controlled in accordance with the invention.

Referring now to the drawing, the circulatory air oven is shown diagrammatically at 1 and is provided with an air heater 2 which is connected over lines 3 and 4 to a ganged switch having switch blades SW1a and SW1b. In the switched position shown the heater is connected to lines 5 and 6 which are connected to a controller (not shown) which serves to heat the oven 1 to a required temperature, say 200° C, and to maintain it at this temperature.

Also within the oven 1 is mounted a mass 7 which has a heater 8, the mass 7 and heater 8 being lagged as shown diagrammatically by dotted lines 9. The heater 8 is connected to ganged switch blades SW2a and SW2b which connect it in the position illustrated, over lines 10a and 10b to the output of a differential power amplifier A1 and a power supply 11 respectively.

Attached to the surface of the mass 7, which is in the form of a 1-inch metal cube, is a junction 12 of a thermocouple, the other junction 13 of which is situated in the oven at a point whose temperature is to be controlled. The thermocouple is connected over lines 14 and 15 to a ganged switch having blades SW3a and SW3b. In the position shown the thermocouple output is connected to the differential power amplifier A1 which is in turn connected to the power supply 11 in the manner shown. When switch blades SW3a and SW3b are in the position shown in dotted lines, the thermocouple is connected to a differential preamplifier A2 which provides an input for a power amplifier A3, the output of which is taken by line 16 to a contact 17 of switch blade SW1a. A contact 18 of switch blade SW1b is connected to the power supply 11.

When switch blades SWa and SW2b are in the position shown in dotted lines the mass heater 8 is connected over lines 19 and 20 to a ramp controller for heating mass 7 in a controlled manner, for instance at a rate of 3° C./minute.

The operation of the system will now be described. Imagine an initial point at which the oven 1 and mass 7 are both at room temperature and suppose it is desired rapidly to heat the oven to a temperature of 200° C and then after an interval of twenty minutes to heat the oven at a rate of 4° C./minute until the temperature of the oven is at 400° C. In this case the various switch blades already referred to will be initially in the position shown so that the air heater 2 heats the oven 1 to 200° C. and controls it to be constant at that temperature, power being supplied to the heater over lines 5 and 6. At the same time the thermocouple will provide an input to the differential power amplifier A1 which will control the power supplied to the mass heater 8 so that the mass 7 will attain and remain at the temperature of the air in the oven in the region of the thermocouple junction 13. After 20 minutes all the switch blades will be automatically switched to the position shown in dotted lines. The mass 7 will now be heated by heater 8 to follow a temperature ramp of 4° C./minute, the power being supplied from the ramp controller (not shown) over lines 19 and 20. At the same time the output from the thermocouple will be fed into the differential preamplifier A2 whose output controls the power supplied to contacts 17 and 18, and hence to the air heater 2, by means of the power amplifier A3. The temperature in the region of the thermocouple junction 13 is now controlled so as to reduce the temperature difference between that region and the mass 7 to a value approaching zero, in the region of 0.1° C. After a further 50 minutes the switch blades will be automatically switched back to the positions shown on the drawing and the temperature of the oven will be retained at 400° C., the temperature of the mass 7 once more being controlled by the temperature of the oven.

An air oven as described has application in gas chromatography, thermogravimetric analysis and differential thermal analysis and is considered to be an improvement over known controls as there is no mechanical wear, maintenance or noise such as is associated with controls employing stepping motors.

The control system described as regards the power supply and amplifiers is exemplary only and may be replaced by any other suitable arrangement. Equally the temperature controller connected to lines 5 and 6 and the ramp controller connected to lines 19 and 20 may be of any suitable form.

Clearly the mass need not necessarily be of any particular material. It would be a pure metal, an alloy or a nonmetallic substance in the solid, liquid or gaseous state. In the liquid or gaseous state there will have to be a container which will comprise part of the mass. The size of the mass is dictated solely by convenience in any particular application.

I claim:
1. Temperature control apparatus for controlling the temperature in a given region including in combination:
 a. a first heat transfer arrangement in thermal contact with said given region;
 b. a mass of material;
 c. a second heat transfer arrangement distinct from said first heat transfer arrangement in thermal contact with said mass and having first and second input terminals for connection to a temperature controller whereby the mass may be controllably heated or cooled;
 d. a temperature measuring means connected to measure the temperature difference between said mass and said given region said temperature measuring means comprising a heat sensitive device having a first portion situated within said given region and remote from said mass and a second portion in contact with said mass;
 e. a controlled power supply connected to supply power to said first heat transfer arrangement; and
 f. control means connected between said temperature measuring means and said power supply whereby said power supply provides power for said first heat transfer arrangement to reduce said temperature difference towards zero.

2. Apparatus according to claim 1 further including switching means having a first position in which said power supply is connected to said first heat transfer arrangement and a second position in which said power supply is connected to said first and second input terminals.

3. Apparatus according to claim 2 in which said control means includes a first amplifier circuit and a second amplifier circuit each having an input and an output, and in which said power supply is connected to both of said outputs and said temperature measuring means is connected to one of said inputs in dependence upon the condition of said switching means.

4. Apparatus according to claim 1 in which said mass is lagged and situated in said given region.

5. Apparatus according to claim 1 in which said temperature measuring means comprises a thermocouple having a first junction and a second junction, said first junction being situated within said given region and remote from said mass and said second junction being in contact with said mass.

6. Apparatus as claimed in claim 1 in which said first heat transfer arrangement is an electric heater coil.

7. Apparatus as claimed in claim 1 in which said second heat transfer arrangement is an electric heater coil.

8. A circulatory air oven provided with a temperature control which includes in combination:
 a. a first electric heater coil situated within said oven;
 b. a mass of material which is lagged and situated within said oven but removed from said first heater coil;
 c. a second electric heater coil situated within said lagging;
 d. first and second input terminal of said second heater coil for connection to a temperature controller whereby said mass may be controllably heated;
 e. a thermocouple having a first junction, a second junction and a pair of output terminals, said first junction being situated within said given region and remote from said mass and said second junction being in contact with said mass;
 f. a controlled power supply;
 g. control means including an amplifier circuit having an input and an output connected to control said power supply; and
 h. switching means having a first condition in which said power supply is connected to said first electric heater coil and said pair of output terminals of said thermocouple are connected to said amplifier circuit input and said first and second terminals are connected to a temperature controller.

9. A circulatory air oven provided with a temperature control as claimed in claim 8 in which said control means includes a further amplifier circuit having a further input and a further output connected to control said power supply, and in which said switching means have a second condition in which said power supply is connected to said first and second input terminals of said second heater coil said pair of output terminals of said thermocouple are connected to said further amplifier circuit input and said first electric heater coil is connected to an independently controlled power source.

10. A method of controlling the temperature in a given region including the steps of:
 a. transferring heat in a controlled manner to or from a mass of known thermal properties which is thermally isolated from said given region;
 b. simultaneously and continuously determining the difference in temperature between said mass and said given region; and
 c. simultaneously and continuously controlling the temperature of said region in dependence upon said temperature difference to reduce it towards zero.

11. A method according to claim 10 including the initial steps of:
 a. transferring heat to or from said given region until said region is at a predetermined temperature;
 b. simultaneously and continually determining the difference in temperature between said given region and said mass; and
 c. simultaneously and continuously controlling the transfer of heat with respect to said region in dependence upon said temperature difference until said mass also reaches said predetermined temperature.